United States Patent
Ohrbom et al.

(10) Patent No.: US 6,849,337 B2
(45) Date of Patent: Feb. 1, 2005

(54) POWDER COATINGS CONTAINING OXIRANE GROUPS BETA TO URETHANE OR UREA GROUPS

(75) Inventors: Walter H. Ohrbom, Hartland Township, MI (US); Timothy S. December, Rochester, MI (US)

(73) Assignee: BASF Corporation, Southfield, MI (US)

(*) Notice: Subject to any disclaimer, the term of this patent is extended or adjusted under 35 U.S.C. 154(b) by 113 days.

(21) Appl. No.: 10/265,060

(22) Filed: Oct. 4, 2002

(65) Prior Publication Data

US 2004/0068060 A1 Apr. 8, 2004

(51) Int. Cl.$^7$ .................. B32B 27/38; C08G 59/02; C08L 83/00
(52) U.S. Cl. .................. 428/413; 428/414; 428/416; 106/287.22; 427/195; 427/202; 427/203; 427/386; 524/904; 525/523; 525/525; 525/526; 525/528
(58) Field of Search ................. 428/413, 414, 428/416; 106/287.22; 524/904; 525/523, 525, 526, 528; 427/195, 202, 203, 386

(56) References Cited

U.S. PATENT DOCUMENTS

| | | | |
|---|---|---|---|
| 4,069,208 A | | 1/1978 | Hoeschele |
| 5,567,761 A | * | 10/1996 | Song .................. 524/523 |
| 5,994,469 A | * | 11/1999 | December et al. .......... 525/181 |
| 6,140,430 A | | 10/2000 | Ruth et al. |
| 6,277,917 B1 | * | 8/2001 | Jurgetz et al. ............. 525/125 |
| 6,541,594 B2 | * | 4/2003 | Ohrbom et al. ............ 528/45 |
| 2003/0100682 A1 | * | 5/2003 | Ohrbom et al. ............ 525/242 |

FOREIGN PATENT DOCUMENTS

| | | | |
|---|---|---|---|
| DE | 31 38 196 | 4/1983 | ............ C09D/3/81 |
| EP | 1 063 269 | 4/2000 | ......... C09D/175/06 |
| JP | 2001/026632 | 1/2001 | |
| RU | 604853 | 12/1975 | |

OTHER PUBLICATIONS

English Translation of JP-57-000121, Ishimura et al. Jan. 1982.*

International Search Report No. PCT/US 03/ 23215, International Filing Date Jul. 25, 2003.

English Abstract from Database WPI, Section Ch, Week 197912, Derwent Publication, NA 1979-235768, XP002262625 & SU 604 853 A Jun. 5, 1978.

English Abstract DE 31 38 196, Apr. 14, 1983, Juergen, et al.

* cited by examiner

Primary Examiner—Jeffrey B. Robertson

(57) ABSTRACT

A powder coating composition contains solid particulates of a mixture of a solid material having at least two epoxide groups, each beta to a urethane or urea group, and a solid crosslinker reactive with epoxide groups.

17 Claims, No Drawings

POWDER COATINGS CONTAINING OXIRANE GROUPS BETA TO URETHANE OR UREA GROUPS

FIELD OF THE INVENTION

This invention concerns thermoset powder coating compositions, especially for automotive vehicles.

BACKGROUND OF THE INVENTION

Powder coating compositions have become increasingly important because they give off very little or no volatile material to the environment when cured. Typically, any such emissions are limited to by-products of the curing reaction, such as blocking agents or volatile condensation products. Powder coatings have found use as both decorative coatings and protective coatings.

Automotive bodies are generally first coated by the cathodic electrocoat process with an acid-salted, amine-containing polymer. The amine-containing polymer is typically crosslinked with a blocked isocyanate crosslinker. A second primer, often called a primer-surfacer, is applied over the electrocoat layer for additional protection, particularly against corrosion and gravel chipping, and to provide a smoother surface upon which to apply the topcoat. Topcoats for automotive and other industrial applications may be a one-layer coating, in which the color is generally uniform through the coating layer, or a clearcoat-basecoat composite coating, having a colored basecoat layer underlying a transparent clearcoat layer. Basecoat-clearcoat composite coatings are widely used and are notable for desirable gloss, depth of color, distinctness of image and/or special metallic effects. Composite coatings are particularly utilized by the automotive industry to achieve a mirror-like, glossy finish.

It is also important for topcoats, including the clearcoat-basecoat composite coatings, to provide the desired color. When electrocoat primers are used, amine from electrocoat primer layer may migrate during thermal cure of later applied coating layers causing undesirable yellowing in those layers. The migration and yellow occur particularly at higher temperatures.

Ruth et al., U.S. Pat. No. 6,140,430 describes an epoxy powder coating containing a non-crystalline epoxy resin, a small amount of a crystalline epoxy agent, a curing agent reactive with epoxy groups, and a catalyst. The crystalline epoxy resin has a melting point preferably greater than 90° C. It is included in the powder coating in an amount sufficient to reduce the coating viscosity during curing so that air entrapped in the powder particles, which would otherwise become bubbles and causing haze in the coating, can escape.

Sorokin et al., RU 604853, discloses epoxyisocyanurate oligomers for making heat-resistant polymers. The epoxyisocyanurate oligomer is dissolved, for example in cyclohexane, and reacted with anhydride- or acid-functional hardeners. A varnish coating applied to metal or glass reportedly has improved heat resistance, impact strength, and tensile strength. The Sorokin patent, however, does not mention powder coatings or address the problems of powder coatings for automotive application or powder coatings used in composite coatings, particularly regarding cure response and yellowing resistance.

SUMMARY OF THE INVENTION

A powder coating composition of the present invention contains solid particulates of a mixture of a solid material having at least two epoxide groups, each beta to a urethane or urea group, and a solid crosslinker reactive with epoxide groups.

In another aspect, the invention provides a composite coating having at least two layers, a first layer of an electrocoat primer that is directly on a metal substrate and a second layer formed from the coating composition of the invention. The second layer may be a primer layer or a pigmented topcoat layer. Whether used as a primer layer or a pigmented topcoat layer, the coating composition of the invention provides faster cure response and reduced overbake yellowing of the topcoat.

In yet another aspect, the invention provides a coating composition of solid particulates of a mixture of a symmetrical solid material having at least two epoxide groups, each beta to a urethane or urea group, and a solid crosslinker reactive with epoxide groups. The coating composition provides a cured coating layer with excellent leveling and smoothness that results from improved flow of the coating during the baking and curing step.

"A" and "an" as used herein indicate "at least one" of the item is present; a plurality of such items may be present, when possible. "About" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art through this ordinary meaning, then "about" as used herein indicates a possible variation of up to 5% in the value.

DETAILED DESCRIPTION OF THE PREFERRED EMBODIMENTS

The following description of the preferred embodiment(s) is merely exemplary in nature and is in no way intended to limit the invention, its application, or uses.

The coating composition of the present invention contains solid particulates of a mixture of a solid material having at least two epoxide groups, each beta to a urethane or urea group, and a solid crosslinker reactive with epoxide groups. An epoxide group beta to a urethane or urea group may be represented by the structures:

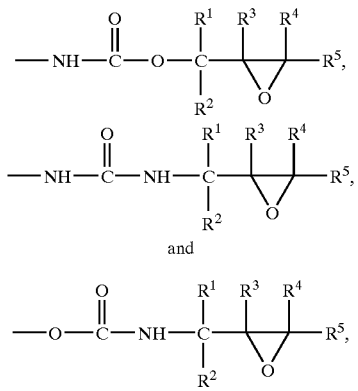

wherein each of $R^1$, $R^2$, $R^3$, $R^4$, and $R^5$ is independently H or an alkyl group of from 1 to 4 carbons. In one embodiment, $R^1$, $R^2$, $R^3$, $R^4$, and $R^5$ are each H.

Such groups may be introduced to a material by a number of different reactions, such as by reaction of allyl amine or allyl alcohol with an isocyanate functional material, followed by epoxidation of the double bond (e.g., by reaction with hydrogen peroxide); reaction of glycidol with an isocyanate functional material; reaction of allyl alcohol with a carbamate functional material (that is, a material having a group

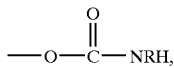

in which R is H or alkyl), again followed by epoxidation of the double bond; reaction of a material having primary amine functionality with allyl carbonate; and so on.

The solid material having at least two epoxide groups, each beta to a urethane or urea group, may be monomeric, oligomeric, or polymeric. Examples of monomeric compounds with epoxide groups beta to urethane or urea groups include, without limitation, the reaction products of monomeric polyisocyanates with glycidol, or with allyl amine or allyl alcohol followed by epoxidation of the double bond, and the reaction products of polyisocyanates extended by capping a diol, diamine, or amino alcohol with the polyisocyanate, e.g. by reaction of about one mole of a diol or a diamine to about two moles of polyisocyanate, with glycidol or with allyl amine or allyl alcohol followed by epoxidation of the double bond.

Examples of suitable polyisocyanate compounds include, without limitation, ethylene diisocyanate, 1,2-diisocyanatopropane, 1,3-diisocyanatopropane, 1,4-butylene diisocyanate, lysine diisocyanate, 1,4-methylene bis(cyclohexyl isocyanate), isophorone diisocyanate, diphenylmethane-4,4'-diisocyanate, methylenebis-4,4'-isocyanatocyclohexane, 1,6-hexamethylene diisocyanate, p-phenylene diisocyanate, tetramethyl xylene diisocyanate, meta-xylene diisocyanate, 2,2,4-trimethyl-1,6-hexamethylene diisocyanate, 1,12-dodecamethylene diisocyanate, cyclohexane-1,3- and -1,4-diisocyanate, 1-isocyanato-2-isocyanatomethyl cyclopentane, 2,3-toluene diisocyanate, 2,4-toluene diisocyanate, 2,5-toluene diisocyanate, the 2,3-, 2,4-, and 2,5-isomers of hexahydrotoluene diisocyanate, 1-methoxyphenyl-2,4-diisocyanate, and combinations of these.

Examples of suitable diol compounds include, without limitation, 1,3-propanediol, 1,2-ethanediol, 1,4-butanediol, 1,5-pentanediol, 1,6-hexanediol, dimethylolpropane, diethyloctanediol, neopentyl glycol, 2-propyl-2-methyl-1,3-propanediol, 2-butyl-2-ethyl-1,3-propanediol, 2,2-diethyl-1,3-propanediol, 1,2-propanediol, 1,3-butanediol, 2,2,4-trimethylpentane-1,3-diol, trimethylhexane-1,6-diol, 2-methyl-1,3-propanediol, diethylene glycol, triethylene glycol, dipropylene glycol, tripropylene glycol, cycloaliphatic diols such as cyclohexane dimethanol, 3-dioxane-5,5-dimethanol, aromatic diols such as 4-xylylene glycol, 1-phenyl-1,2-ethanediol, Bisphenol A, hydroquinone, and resorcinol, as well as combinations of these.

Examples of suitable diamine compounds include, without limitation, alkylene diamines such as hexamethylenediamine and 1,8-diaminooctane, the isomers of diaminocyclohexane, 2,5-diamino-2,5-dimethylhexane, 1-amino-3,3,5-trimethyl-5-aminomethylcyclohexane, the isomers of 1-methylcyclohexanediamine, other alkyl-substituted cyclohexanediamines such as isopropyl-2,4- and/or -2,6-diaminocyclohexane, 1,3-cyclohexanebis (methylamine), 5-amino-2,2,4-trimethyl-1-cyclopentane-methylamine, 2,4'- and 4,4'-methylenebis (cyclohexylamine), 3,3'-dimethyl-4,4'-methylenebis (cyclohexylamine), the isomers of diaminodicyclohexylmethane containing a methyl group as main substituent (monomethyldiaminodicyclohexylmethane), 3(4)-aminomethyl-1-methylcyclohexylamine, and bridged cyclohexanediamines. Preferred primary polyamines may be represented by the following compounds: 1,3-cylcohexanediamine, 1,4-cyclohexanediamine, 1,3-cyclohexanebis(methylamine), 1-amino-3,3,5-trimethyl-5-(aminomethyl)cyclohexane, 4,4'-diaminodicyclohexylmethane, 3,3'-dimethyl-4,4'-methylenebis(cyclohexylamine), 1-methyl-2,4-diaminocyclohexane, 1-methyl-2,5-diaminocyclohexane, 1-methyl-3,5-diaminocyclohexane, 1-methyl-2,6-diaminocyclohexane, the isomers of monomethyldiaminodicyclohexylmethane, and 3(4)-aminomethyl-1-methyl-cyclohexylamine. Other useful polyamines include polyalkylene polyamines such as diethylene triamine, triethylene tetramine, tetraethylene pentamine, ethylenediamine, butylenediamine, and propylenediamine, and combinations of these.

Examples of useful amino alcohols include, without limitation diethanolamine, 2-amino-1-ethanol, 2-amino-1-propanol, and other amino alcohols that may be made by reacting materials with an epoxide group with primary amines.

In general, the polyisocyanate may be the polyisocyanate-functional reaction product of one or more of these diisocyanates with a diol, a diamine, an amino alcohol, or combinations thereof. These reactions products may be monomeric, oligomeric, or polymeric, depending on the ratios of the reactants, as is well known in the art.

The solid material having at least two epoxide groups, each beta to a urethane or urea group, may also be oligomeric or polymeric. Examples of oligomeric compounds with epoxide groups beta to urethane groups include, without limitation, the reaction products oligomeric polyisocyanates with glycidol, or the reaction products of oligomeric polyisocyanates with allyl amine or allyl alcohol followed by epoxidation of the double bond. Examples of suitable oligomeric polyisocyanate include, without limitation, the biurets, allophonates, isocyanurates, and carbodiimides of the monomeric polyisocyanates already mentioned.

Examples of polymeric compounds with epoxide groups beta to urethane groups include, without limitation, the reaction products of polymers having at least two isocyanate groups with glycidol, or the reaction products of oligomeric polyisocyanates with allyl amine or allyl alcohol followed by epoxidation of the double bond. Examples of such polymers include, without limitation, isocyanate-functional polyurethanes, isocyanate-functional polyesters, and isocyanate-functional vinyl polymers, particularly isocyanate-functional acrylic polymers.

Isocyanate-functional polyurethanes may be prepared by reaction of a polyol or polyols with a polyisocyanate or mixture of polyisocyanates. Preparation of polyurethanes for coating compositions are described in many publications. In general, monomeric polyisocyanates such as those mentioned already may be used in preparing the polyurethane. Diisocyanates are preferred, although small amounts of polyisocyanates having more than two isocyanate groups may be used so long as gellation is avoided, for example by also including a certain amount of a monoisocyanate. The polyol is also preferably difunctional, although minor amounts of polyols with more than two hydroxyl groups may be included, for example along with a monofunctional alcohol. Examples of preferred diols that are used as polyurethane chain extenders include, without limitation, 1,6- hexanediol, cyclohexanedimethanol (sold as CHDM by Eastman Chemical Co.), 2-ethyl-1,6-hexanediol, 3-hydroxy-2,2-dimethylpropyl 3-hydroxy-2,2-dimethylpropionate (sold by Eastman Chemical Co. as Esterdiol 204), and 1,4-butanediol. Examples of higher functional polyhydroxy compounds include, without limitation, trimethylolpropane, trimethylolethane, pentaerythritol, and so on. Polymeric polyols can also be used, such as polyester polyols, polyether polyols, and polycarbonate polyols. Mixtures of any of the polyisocyanates and any of the polyols may be used. In a preferred embodiment, a polyester polyol is included, in particular a polyester that is the reaction product of caprolactone with a diol. The polyurethane polymerization may be catalyzed with, e.g., organotin catalysts such as dibutyltin diacetate. Isocyanate terminal groups may be provided by adjusting the stoichiometry of the polyol and polyisocyanate reactants in the reaction mixture. It is also known, for example, to provide a two-stage reaction, first preparing an hydroxyl-functional polyurethane and then capping with excess equivalents of polyisocyanate. This latter method is a preferred way to provide more than two isocyanate groups per molecule, for example by reacting about one mole of a linear, hydroxyl-functional polyurethane with about two moles of a polyisocyanate compound having three or more isocyanate groups per molecule.

Isocyanate-functional polyesters may be prepared by reaction of hydroxyl functional polyester with excess equivalents of polyisocyanate, as in the capping of hydroxyl-functional polyurethane reaction just described. Hydroxyl-functional polyesters are in turn prepared by the polyesterification of organic polycarboxylic acids, especially diacids (e.g., phthalic acid, hexahydrophthalic acid, adipic acid, maleic acid) or their anhydrides with organic polyols, especially diols (e.g., ethylene glycol, butylene glycol, neopentyl glycol). Hydroxyl-functional polyesters are prepared by including an excess of the polyol. Hydroxyl-functional polyesters may also contain polylactone segments prepared by reaction of lactone and/or hydroxy acid with an active-hydrogen containing monomer during or after polyester synthesis. In one preferred embodiment, a polyol, preferably a diol, is extended with a lactone, preferably with ε-caprolactone, to form an hydroxyl-functional polyester. In another preferred synthesis, an hydroxy-functional polyester resin is reacted with a lactone or hydroxycarboxylic acid after the polymerization reaction.

Isocyanate-functional vinyl polymers, particularly acrylic polymers, may be synthesized by copolymerization of isocyanate-functional monomers, such as isocyanatoethyl methacrylate, isocyanatoethyl acrylate, vinyl isocyanate, isopropenyl isocyanate, and meta-isopropenyl-α,α-dimethylbenzyl isocyanate, along with one or more other copolymerizable vinyl monomers. Examples of the copolymerizable monomers include, without limitation, acrylic and methacrylic acids; esters and other derivatives of acrylic acid and methacrylic acid, particularly esters of saturated aliphatic and cycloaliphatic alcohols containing 1 to 20 carbon atoms such as methyl, ethyl, n-propyl, n-butyl, 2-ethylhexyl, isobutyl, isopropyl, cyclohexyl, tetrahydrofurfuryl, and isobornyl acrylates and methacrylates; vinyl esters; aromatic vinyl monomers such as styrene, and combinations of these. Monomers with groups reactive with the isocyanate groups are avoided so that the product is not gelled.

In one embodiment the solid material having at least two epoxide groups, each beta to a urethane or urea group is crystalline. The crystalline, epoxide-functional additive has a melting point of at least about 30° C., preferably at least about 80° C. The crystalline, epoxide-functional materials have $C_2$ or higher symmetry. The functional-functional compound with $C_2$ or higher symmetry may be represented by the formula $R(X)_y$, with X representing an epoxide group beta to a urethane or urea linkage and $y \geq 2$.

As used herein, a molecule with symmetry means that certain parts of the molecule can be interchanged, via a symmetry operation, with others without altering either the identity or the orientation of the molecule.

Symmetry operations are geometrically defined ways of exchanging equivalent parts of a molecule. However, such operations are symmetry operations if, and only if, the appearance of the molecule is exactly the same relative to the pre- and post-symmetry operation view. Thus, the term "symmetrical" as used herein refers to a molecule having a three-dimensional structure that is identical relative to the pre- and post-symmetry operation views. Put another way, "[a] molecule possesses a symmetry element if the application of the operation generated by the element leaves the molecule in an indistinguishable state." *Molecular Symmetry and Group Theory*, Alan Vincent, Wiley & Sons, NY, 1977, reprinted 1981, page 21, hereby incorporated by reference.

The symmetry operations indicating crystallinity are limited to proper rotation symmetry operations. Proper rotation, also referred to as "$C_n$", refers to simple rotation about an axis passing through the molecule by an angle $2\pi/n$ or an angle $360°/n$. A molecule is said to have a $C_n$ symmetry element if, after undergoing a proper rotation $C_n$ operation, its appearance is indistinguishable from its appearance prior to undergoing the proper rotation $C_n$ operation, irrespective of conformational isomers. Put another way, a molecule possesses a symmetry element, in this case $C_n$, when one or more of its conformational isomers possesses that symmetry element. The highest symmetry element that belongs to any conformational isomer of the molecule is assigned to the molecule.

While it may be appreciated that all molecules have $C_n$ symmetry where n is 1, the present embodiment only concerns R groups also having $C_n$ symmetry where n is 2 or higher. R may be an aliphatic, a cycloaliphatic, or an aromatic group-containing structure having the required $C_n$ symmetry. R may further comprise aromatic groups or additional functional groups so long as the symmetry of R is maintained. In the absence of additional functional groups, examples of illustrative R groups include $C_4H_8$ and $C_6H_{12}$. Illustrative examples of suitable crystalline compounds include, without limitation,

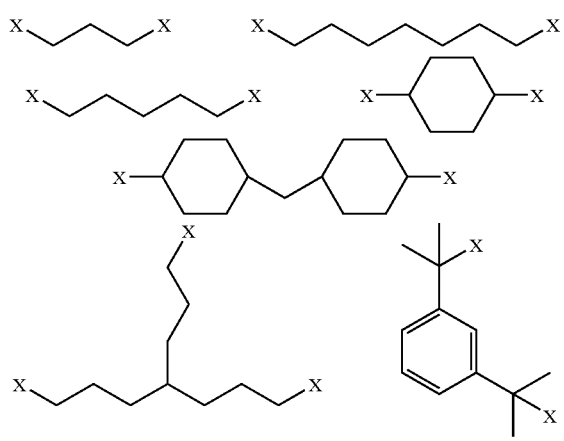

-continued
and

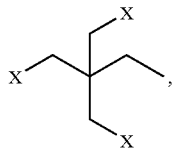

with "X" is a group having an epoxide group beta to the urethane or urea linkage.

The coating composition also contains a solid material reactive with epoxide groups, preferably an active hydrogen-functional material such as acid- or anhydride-functional monomeric compounds, oligomers, or polymers. One type of acid-functional monomeric, oligomeric, or polymeric compound is a compound having acidic phenolic hydrogens. Additional suitable examples include, without limitation, dodecanedicarboxylic acid, acid-functional acrylic polymers and other acid-functional vinyl polymers, acid-functional polyesters, acid-functional polyurethanes, and combinations of these.

Other epoxide functional materials (in other words, epoxide functional materials that do not have epoxide groups beta to urethane or urea groups) may also be included in the powder coating of the invention. Suitable examples of additional epoxide-functional materials include, without limitation, acrylic polymers have pendant glycidyl groups (e.g., from copolymerization of a glycidyl group-containing monomer such as glycidyl methacrylate), epoxide functional polyurethanes, epoxide functional polyesters, and the like, as well as combinations thereof. In one embodiment, additional epoxide-functional material is included in the powder coating composition and the material with epoxide groups beta to urethane or urea groups preferably provides at least about 10%, preferably at least about 20%, and more preferably at least about 50% of the total epoxide equivalents of the powder coating composition.

It may be desirable to incorporate into the powder coating composition other materials, such as fillers, pigments, leveling agents to help coalesce the film, plasticizers, air release agents such as benzoin, flow agents such as poly(butyl acrylates) and poly(2-ethylhexyl acrylates), hindered amine light stabilizers and ultraviolet light absorbers, antioxidants, and/or catalysts. Moreover, a texturing agent may also be included, for example to more finely adjust the degree of texture.

Pigments and fillers may be utilized in amounts typically of up to 40% by weight, based on total weight of the coating composition. The pigments used may be inorganic pigments, including metal oxides, chromates, molybdates, phosphates, and silicates. Examples of inorganic pigments and fillers that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, calcium carbonate, talc, barytes, ferric ammonium ferrocyanide (Prussian blue), ultramarine, lead chromate, lead molybdate, aluminum pigments, and mica flake pigments. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

Hindered amine light stabilizers, ultraviolet light absorbers, and anti-oxidants may be added in ways and amounts known to the art to augment the durability of the finished coating, and are particularly useful when the finished coating may be subjected to outdoor exposure.

The thermosetting powder coating compositions can be prepared by first melt blending the ingredients of the coating compositions. This process usually involves dry blending the ingredients in a planetary mixer and then melt blending the admixture in an extruder at a suitable temperature. The extrusion temperature is preferably chosen so that it is high enough to allow the resin to melt to a viscosity that produces good mixing and pigment wetting, but is not so high that any significant amount of co-reaction between resin and crosslinker occurs. The melt blending is usually carried out within the range of from 80° C. to 130° C.

The extrudate is then cooled and pulverized. The extrudate may be crushed to a fine flake or granule and then ground by typical methods employed in the art, and classified by sieving or other means. The maximum particle size and the particle size distribution are controlled in the classifying step and affect the smoothness of the final film. Requirements for these parameters depend upon the particular use and application method.

The thermosetting powder coating composition can be applied onto many different substrates, including metal substrates such as bare steel, phosphated steel, galvanized steel, or aluminum; and non-metallic substrates, such as plastics and composites. The substrate may also be any of these materials having upon it already a layer of another coating, such as a layer of an electrodeposited primer, cured or uncured before the application of the powder coating compositions. The powder coating composition may be applied to a coil substrate or a shaped substrate, such as automotive vehicle bodies, appliances, satellite dishes, brown goods (e.g., stereo cases), computer cases, office furniture and office machines such as copy machines, typewriters, printers, filing cabinets, desks, and bookcases; staplers, hole punchers, non-slip (non-skid) exterior surfaces that may benefit from the textured finish; architectural elements; and automotive vehicle components.

Application can be, for example, by electrostatic spraying or by use of a fluidized bed. Electrostatic spraying is the preferred method. The coating powder can be applied in one or more passes to provide a film thickness after cure of typically from about 20 to about 100 microns. The substrate can optionally be preheated prior to application of a powder coating composition to promote uniform and thicker powder deposition.

After application of the coating composition to the substrate, the coating is cured, preferably by heating at a temperature and for a length of time sufficient to cause the reactants to form an insoluble polymeric network. The cure temperature is usually from about 145° C. to about 205° C., and the length of cure is usually about 15 minutes to about 60 minutes. Preferably, the coating is cured at about 150° C. to about 180° C. for about 20 to about 30 minutes. Heating can be done in infrared and/or convection ovens.

The powder coating composition of the invention can be formulated as a primer coating composition, including a color-keyed primer coating composition, a single layer topcoat coating composition, a basecoat coating composition, or a clearcoat coating composition. Basecoat coating compositions include appropriate pigments to provide the desired color and/or special effect to the coating layer. Clearcoat coating compositions do not include opaque pigments.

In one embodiment of the invention, a composite coating of the invention has one layer, preferably a primer coating layer, that is obtained by reaction of the powder coating composition of the invention. The composite coating has a topcoat layer, which may include basecoat coating layer applied over the primer coating layer and an outer, clearcoat layer applied over the basecoat coating layer. One of the topcoat layer, basecoat layer, or clearcoat layer may be obtained from a powder coating composition according to the invention in addition to, or instead of, the primer layer.

The primer coating composition according to the invention is applied directly to the substrate or over one or more other layers of primer, such as the electrocoat primer. The applied primer coating composition is then cured to form a primer coating layer. The electrocoat primer or other first layer of primer may be cured at the same time as the primer coating layer of the invention in a process known as "wet-on-wet" coating. The primer coating layer formed from the primer coating composition of the invention is the outermost primer layer of the composite coating. In some applications, such as inside automotive deck lids, engine compartments, inside hoods, and in door jambs, the powder coating composition of the invention forms the outermost layer of coating, preferably being applied over a cured or uncured layer of electrocoat primer.

A topcoat composition is applied over the primer coating layer and cured to form a topcoat layer. The substrate at that point is then covered with a composite coating that has at least one layer of primer coating derived from the inventive compositions and at least one layer of topcoat. Alternatively, the topcoat layer may be derived from the inventive compositions in addition to, or instead of, the primer layer. In a preferred embodiment, the primer layer is overcoated with a topcoat applied as a color-plus-clear (basecoat-clearcoat) topcoat. In a basecoat-clearcoat topcoat, an underlayer of a pigmented coating, the basecoat, is covered with an outer layer of a transparent coating, the clearcoat. Basecoat-clearcoat topcoats provide an attractive smooth and glossy finish and generally improved performance.

Crosslinking compositions are preferred as the topcoat layer or layers when such layers are not a composition of the invention. Coatings of this type are well-known in the art and include waterborne compositions as well as solvent-borne compositions. For example, the topcoat may be a clearcoat according to U.S. Pat. No. 5,474,811, applied wet-on-wet over a layer of a basecoat composition. Polymers known in the art to be useful in basecoat and clearcoat compositions include, without limitation, acrylics, vinyl, polyurethanes, polycarbonates, polyesters, alkyds, and polysiloxanes. Acrylics and polyurethanes are preferred. Thermoset basecoat and clearcoat compositions are also preferred, and, to that end, preferred polymers comprise one or more kinds of crosslinkable functional groups, such as carbamate, hydroxy, isocyanate, amine, epoxy, acrylate, vinyl, silane, acetoacetate, and so on. The polymer may be self-crosslinking, or, preferably, the composition may include a crosslinking agent such as a polyisocyanate or an aminoplast resin of the kind described above. In one embodiment, waterborne basecoat compositions and/or clearcoat compositions having low volatile organic content are used. The waterborne basecoat and waterborne clearcoat compositions each preferably has a volatile organic content of less than about 1.5, more preferably less than about 1.3, and even more preferably less than about 0.7.

Each layer of the composite coatings of the invention can be applied to an article to be coated according to any of a number of techniques well-known in the art. These include, for example, spray coating, dip coating, roll coating, curtain coating, and the like. If an initial electrocoat primer layer is applied to a metallic substrate, the electrocoat primer is applied by electrodeposition. For automotive applications, the primer coating layer and the topcoat layer or layers are preferably applied by spray coating, particularly electrostatic spray methods. Coating layers of one mil or more are usually applied in two or more coats, separated by a time sufficient to allow some of the solvent or aqueous medium to evaporate, or "flash," from the applied layer. The flash may be at ambient or elevated temperatures, for example, the flash may use radiant heat. The coats as applied can be from 0.5 mil up to 3 mils dry, and a sufficient number of coats are applied to yield the desired final coating thickness.

The outermost primer layer may be cured before the topcoat is applied. The cured primer layer may be from about 0.5 mil to about 2 mils thick, preferably from about 0.8 mils to about 1.2 mils thick. Color-plus-clear topcoats are usually applied wet-on-wet. The compositions are applied in coats separated by a flash, as described above, with a flash also between the last coat of the color composition and the first coat the clear. The two coating layers are then cured simultaneously. Preferably, the cured basecoat layer is 0.5 to 1.5 mils thick, and the cured clear coat layer is 1 to 3 mils, more preferably 1.6 to 2.2 mils, thick. Alternatively the primer layer and the topcoat can be applied "wet-on-wet." For example, the primer composition can be applied, then the applied layer flashed; then the topcoat can be applied and flashed; then the primer and the topcoat can be cured at the same time. Again, the topcoat can include a basecoat layer and a clearcoat layer applied wet-on-wet.

In a preferred embodiment, the coated article is an automotive body or part or steel coil.

The invention is further described in the following example. The examples are merely illustrative and do not in any way limit the scope of the invention as described and claimed. All parts are parts by weight unless otherwise noted.

EXAMPLE 1

Preparation of Material with Epoxide Functionality Beta to Urethane Groups

A mixture of 48.7 parts by weight of anhydrous methyl propyl ketone and 26.7 parts by weight of hexamethylene diisocyanate was heated to 50° C. under an inert atmosphere. At that temperature, 0.03 parts by weight of dibutyl tin dilaurate were first added, followed by a slow addition of 22.4 parts by weight of glycidol. The reaction temperature was allowed to reach 75° C. during the glycidol addition. The reaction temperature was increased to 80° C. and held until all the glycidol was consumed. A small amount, 2.2 parts by weight, of n-butanol was then added. When the reaction was complete, the solvent medium and excess n-butanol were removed by vacuum distillation to obtain a solid product with a melting point of about 81° C.

EXAMPLE 2

Powder Coating According to the Invention

A powder coating was prepared by melt mixing 27.87 parts by weight of a polyester resin (acid number=34), 3.8 parts by weight of the material with epoxide functionality beta to urethane groups prepared in Example 1, 5.44 parts by weight of an acrylic resin (acid number=75, weight average molecular weight of about 15,000), 0.18 parts by weight benzoin, 15 parts by weight of an epoxy resin based on hydrogenated bisphenol A (EEW=1039), 0.88 parts by weight of a flow agent, 0.22 parts by weight trimethylolpropane, 0.54 parts by weight of a light stabilizer package, 17.8 parts by weight of titanium dioxide pigment, 0.04 parts by weight of tinting pigments, and 17.8 parts by weight of barium sulfate filler. The melt mixture was solidified and crushed, then retch milled. The milled material was sieved through a 70 micron screen.

The resulting powder coating was sprayed onto test panels 4 inches by 12 inches, and tested against the comparative powder coating composition that follows.

Comparative Example A
Comparative Powder Coating Composition without Oxirane Groups Beta to Urethane Linkages Comparative Example A was prepared in the same way as Example 2, by first melt mixing these materials: 27.87 parts by weight of a polyester resin (acid number=34), 5.44 parts by weight of an acrylic resin (acid number=75, weight average molecular weight of about 15,000), 0.24 parts by weight benzoin, 38.3 parts by weight of an epoxy resin based on hydrogenated bisphenol A (EEW=1039), 1.23 parts by weight of a flow agent, 0.31 parts by weight trimethylolpropane, 0.74 parts by weight of a light stabilizer package, 24.4 parts by weight of titanium dioxide pigment, 0.04 parts by weight of tinting pigments, and 24.4 parts by weight of barium sulfate filler. The ratio of equivalents acid to equivalents epoxide is the same as for Example 2. The pigment and filler weight is adjusted to maintain the same P/B weight ratio. The other materials are adjusted to maintain the same weight percent.

The following tests were performed to demonstrate the improved performance of the invention powder coating composition.

The cure response was tested for three bake (curing) conditions: 20 minutes at 320° F., 20 minutes at 340° F., and 20 minutes at 360° F. The cure response was characterized by solvent resistance and Fisher Microhardness.

Solvent resistance. The powder coating was applied to a 4 inch by 12 inch (about 10.2 cm by 30.5 cm) steel panel having a layer of cured electrocoat primer at a thickness to produce a cured layer with about 1.8 mil (about 46 microns) filmbuild. The powder coating was cured according at the given temperature for the given length of time. The cured coating was tested with 100 doublerubs of the given solvent and rated in this way" 0=no visible marring; 1=slight marring of primer; 2=noticeable marring of primer; 3=electrocoat primer visible, substantial marring; 4=primer removed to electrocoat primer.

Fisher Microhardness. The powder coating was applied to a 4 inch by 12 inch (about 10.2 cm by 30.5 cm) steel panel having a layer of cured electrocoat primer at a thickness to produce a cured layer with about 1.8 mil (about 46 microns) filmbuild. The powder coating was cured according at the given temperature for the given length of time. The hardness of the cured coating was tested using a Fisher Microhardness instrument. The universal hardness (HU) in N/mm$^2$ was measured for each sample.

Yellowing. The color stability of the film after baking is an important aspect of this coating. The panels were baked for 20 minutes at 360° F. the amount of yellowing of the white panels was rated based on a visual scale of 0 to 4 with 4 being the most yellow. The cured coating of Example 2 had less yellowing than that of the Comparative Example A.

Chip. The panels were tested for stone chip resistance. the panels were put in the freezer at −25° C. for 12 hours before the start of the chip test. Three pints of gravel were then shot at the panels with an air pressure of 70 psi according to standard automotive coating testing procedures. The loose paint was removed by application and pull off of masking tape. The paint loss was measured by image analysis and reported a s a percent of paint lost form a 4-inch by 6-inch area. Example 2 of the invention had less paint loss that Comparative Example A.

| | Example 2 | Comparative Example A |
|---|---|---|
| cure: 20 min. at 320° F. (160° C.), MEK doublerubs | 2 | 4 |
| cure: 20 min. at 340° F. (171° C.), MEK doublerubs | 0 | 3 |
| cure: 20 min. at 360° F. (182° C.), MEK doublerubs | 4 | 2.5 |
| cure: 20 min. at 320° F. (160° C.), Isopropanol doublerubs | 1 | 2 |
| cure: 20 min. at 340° F. (171° C.), Isopropanol doublerubs | 0 | 2 |
| cure: 20 min. at 360° F. (182° C.), Isopropanol doublerubs | 1 | 1 |
| Fisher Microhardness, 20 min. at 320° F. (160° C.) | 216.9 N/mm2 | 182.2 N/mm2 |
| Fisher Microhardness, 20 min. at 340° F. (171° C.) | — | 184.7 N/mm2 |
| Fisher Microhardness, 20 min. at 360° F. (182° C.) | 264.8 N/mm2 | 185.4 N/mm2 |
| Yellowing | 2 | 3 |
| Chip: 20 min. at 320° F. (160° C.) (% area removed) | 3.4 | 7.5 |
| Chip: 20 min. at 340° F. (171° C.) (% area removed) | 3.6 | 10.7 |
| Chip: 20 min. at 360° F. (182° C.) (% area removed) | 3.3 | 7.1 |

The results of the solvent doublerubs and Fisher Microhardness testing shown in the table indicate the faster cure response when material having epoxide groups beta to a urethane group is included in the coating composition. The improvement in cure response with Example 2 of the invention is illustrated by the improvement in solvent resistance at the low bake temperature of 320° F., improvement in film hardness, and improvement in chip resistance. The improvement in cure response is important because it allows the coating to be cured at a lower temperature, which reduces energy costs in manufacturing. It is particularly notable that the improved cure response is obtained using an aliphatic epoxy-based coating composition. Aliphatic epoxy-based formulations offer improved outdoor durability compared to aromatic epoxy-based formulations, but aliphatic epoxy-based formulations generally require significantly higher baking temperatures to fully cure.

The invention has been described in detail with reference to preferred embodiments thereof. It should be understood, however, that variations and modifications can be made within the spirit and scope of the invention.

What is claimed is:

1. A powder coating composition, comprising solid particulates of a mixture of a solid material having at least two epoxide groups, each beta to a urethane or urea group, and a solid crosslinker reactive with epoxide groups wherein the solid material having at least two epoxide groups, each beta to a urethane or urea group, is prepared by a process that includes a step of reacting an oligomeric or polymeric polyisocyanate with a member selected from the group consisting of glycidol, allyl amine, and allyl alcohol.

2. A powder coating composition according to claim 1, wherein the oligomeric or polymeric polyisocyanate is a member selected from the group consisting of biurets, allophonates, isocyanurates, and carbodiimides of monomeric diisocyanates and isocyanate-functional acrylic polymers.

3. A powder coating composition, comprising solid particulates of a mixture of a solid material having at least two epoxide groups, each beta to a urethane or urea group, and a solid crosslinker reactive with epoxide groups and further comprising a second solid material having at least two epoxide groups, wherein said epoxide groups are not beta to urethane or urea groups.

4. A powder coating composition according to claim 3, wherein the material with epoxide groups beta to urethane or urea groups provides at least about 10% of the total epoxide equivalents of the powder coating composition.

5. A powder coating composition according to claim 3, wherein the material with epoxide groups beta to urethane or urea groups provides at least about 20% of the total epoxide equivalents of the powder coating composition.

6. A powder coating composition according to claim 3, wherein the material with epoxide groups beta to urethane or urea groups provides at least about 50% of the total epoxide equivalents of the powder coating composition.

7. A powder coating composition according to claim 3, wherein the second solid material is a member selected from the group consisting of acrylic polymers have pendant glycidyl groups, epoxide-functional polyurethanes, epoxide-functional polyesters, and combinations thereof.

8. A powder coating composition according to claim 3, wherein the solid material having at least two epoxide groups, each beta to a urethane or urea group have at least two structures selected from the group consisting of

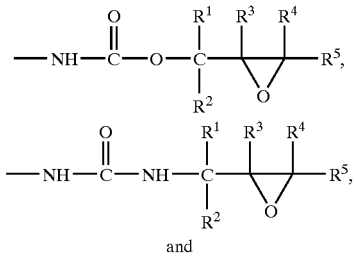

and

-continued

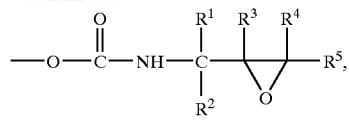

wherein each of $R^1$, $R^2$, $R^3$, $R^4$, and $R^5$ is independently H or an alkyl group of from 1 to 4 carbons, and a solid crosslinker reactive with epoxide groups.

9. A powder coating composition according to claim 8, wherein each of $R^1$, $R^2$, $R^3$, $R^4$, and $R^5$ is H.

10. A method of coating a substrate, comprising a step of applying a powder coating composition according to claim 3 to a substrate.

11. A method according to claim 10, wherein the substrate comprises a member selected from the group consisting of metal, steel coil, phosphated steel, plastics, composites, and these substrates already having a layer of another coating thereon.

12. A method of producing a composite coating on a metallic substrate, comprising steps of:
applying to the metallic substrate a first layer of an electrocoat primer and
applying over the first layer a second layer formed from a powder coating composition according to claim 1.

13. A method according to claim 12, wherein the powder coating composition is applied as a primer layer, and wherein the method further comprises a step of applying at least one layer of a topcoat coating over the primer layer.

14. A method according to claim 12, wherein the powder coating composition is applied as topcoat layer.

15. A method according to claim 14, wherein the powder coating composition is applied as a basecoat layer, and wherein the method further comprises a step of applying at least one layer of a clearcoat coating over the basecoat layer.

16. A method according to claim 14, wherein the powder coating composition is applied as a clearcoat layer, and wherein the method further comprises a step of applying at least one layer of a basecoat coating directly under the powder coating composition.

17. A composite coating produced according to the method of claim 12.

* * * * *